United States Patent
Deivasigamani et al.

(10) Patent No.: US 8,965,584 B2
(45) Date of Patent: Feb. 24, 2015

(54) MASTERLESS CONTROL SYSTEM METHODS FOR NETWORKED WATER HEATERS

(75) Inventors: Sridhar Deivasigamani, Peoria, IL (US); Sivaprasad Akasam, Peoria, IL (US)

(73) Assignee: Intellihot Green Technologies, Inc., Galesburg, IL (US)

(*) Notice: Subject to any disclaimer, the term of this patent is extended or adjusted under 35 U.S.C. 154(b) by 516 days.

(21) Appl. No.: 13/435,193

(22) Filed: Mar. 30, 2012

(65) Prior Publication Data

US 2012/0191256 A1 Jul. 26, 2012

Related U.S. Application Data

(63) Continuation-in-part of application No. 12/699,487, filed on Feb. 3, 2010, now Pat. No. 8,175,752.

(60) Provisional application No. 61/149,418, filed on Feb. 3, 2009.

(51) Int. Cl.
- *G05B 13/00* (2006.01)
- *G05B 11/00* (2006.01)
- *F24D 17/00* (2006.01)
- *F24D 19/10* (2006.01)
- *G05D 23/19* (2006.01)

(52) U.S. Cl.
CPC ........ *F24D 17/0026* (2013.01); *F24D 19/1051* (2013.01); *G05D 23/1927* (2013.01); *F24D 2200/043* (2013.01); *F24D 2200/08* (2013.01)
USPC .............. 700/275; 700/20; 122/1 C; 237/8 A

(58) Field of Classification Search
USPC .............. 700/19, 20, 275, 282, 300; 122/1 C, 122/13.01; 236/21 B; 237/8 A, 19; 126/615
See application file for complete search history.

(56) References Cited

U.S. PATENT DOCUMENTS

| | | | |
|---|---|---|---|
| 7,058,457 B2 * | 6/2006 | Kuwahara et al. | 700/20 |
| 7,506,617 B2 | 3/2009 | Paine | |
| 8,175,752 B2 * | 5/2012 | Deivasigamani et al. | 700/275 |
| 2007/0144458 A1 | 6/2007 | Mukomilow | |
| 2008/0216771 A1 | 9/2008 | Paine | |
| 2009/0064944 A1 | 3/2009 | Paine | |
| 2010/0195991 A1 | 8/2010 | Deivasigamani et al. | |
| 2011/0041781 A1 | 2/2011 | Deivasigamani et al. | |

OTHER PUBLICATIONS

Grand Hall Enterprise Co., Ltd., Eternal Advanced Hybrid Water Heating Operator's Manual, Jul. 4, 2009, pp. 3 and 8, 157110293, Grand Hall Enterprise Co., Ltd., Taipei, Taiwan.

* cited by examiner

*Primary Examiner* — Charles Kasenge
(74) *Attorney, Agent, or Firm* — Tracy Jong Law Firm; Tracy P. Jong; Cheng Ning Jong

(57) ABSTRACT

Disclosed is a masterless control system for controlling a plurality of fluidly and operably connected water heaters to meet a hot water demand such that overall efficiency is maximized and usage disparity between water heaters is minimized. There is further disclosed a method for detecting a small system demand in said network by adjusting the setting of each flow limiting valve of each water heater. There is still further disclosed a method for enabling seamless addition or removal of a heater in service and heating load distribution to water heaters.

16 Claims, 7 Drawing Sheets

MASTERLESS CONTROL SYSTEM METHODS FOR NETWORKED WATER HEATERS

PRIORITY CLAIM AND RELATED APPLICATIONS

This continuation-in-part application claims the benefit of priority from provisional application U.S. Ser. No. 61/149,418 filed Feb. 3, 2009 and non-provisional application U.S. Ser. No. 12/699,487 filed Feb. 3, 2010. Each of these applications is incorporated by reference in its entirety.

BACKGROUND OF THE INVENTION

1. The Field of the Invention

The present invention relates generally to the control of heating devices, and more specifically, to a masterless control scheme of a network of fluidly and functionally connected water heaters.

2. Background Art

The art of using water heaters in cascaded fashion to meet large water heating loads is not new. In a cascade system, a plurality of water heaters is used to participate in sharing water heating load to meet a demand. Typically, in a large commercial building, apartment complex, hotel or laundromat, the demand for hot water can range from zero to a very large demand in an instant. Therefore, a system capable of providing a demand in real time ranging from very small value to very large value is needed. A single commercial or residential hot water heater is incapable of providing such a wide ranging demand in real time. Another drawback of using a single unit under such circumstance is that it provides a single point of failure. When a single water heater is removed for repair or maintenance, the entire building would be without hot water. Other drawbacks of using a single water heater include the excessive physical size and inefficient heating associated with excessive physical size. Heat transfer occurs only through a small surface area as compared to the volumetric flowrate of such system. One solution commonly used in solving the drawbacks associated with using a single heater for a severely varying and large demand is to leverage the heating capacity of multiple water heaters. As such, multiple water heater units may be cascaded to be fluidly and functionally connected to form a network of water heaters so that one water heater can be turned on to service a small demand while multiple units can be turned on simultaneously to service a sudden change to a large demand. Furthermore, a cascaded system involving multiple water heaters affords failure redundancy not available in a single water heater system. One or multiple units may be removed for service without interrupting the operation of remaining water heaters in the network.

The term "cascade" is used herein to imply that the demand is met in cascading fashion by the supply of hot water. For instance, a demand is met by turning on a series of water heaters typically fluidly and functionally connected in series such that they are activated or deactivated successively in the order of their fluid and functional connection in the series. In a conventional cascade system, the last water heater turned on is the modulating boiler while the capacity of other previously selected and turned on water heaters is pegged at their maximum output. As such, the last water heater turned on may experience excessive cycling on and off if a requested demand falls within a dead band. Various control schemes have been devised to provide for those situations where the overall heat demand for the system of a plurality of water heaters falls within a zone lying between the maximum heat output of a water heater and the sum of the maximum heat output of this water heater and the minimum heat output of the next adjacent water heater. This zone, which may be referred to as a dead band or dead zone, presents unique operational problems because the next adjacent boiler cannot modulate within that range.

U.S. Pat. No. 7,506,617 to Paine (hereinafter Paine) entitling "Control System for Modulating Water Heater" discloses a control system which minimizes the cycling on and off of such next adjacent boiler if the overall demand falls in a dead band. The control system is claimed to be particularly suited for use with a plurality of modulating water heaters, which may be boilers, arranged for control in a cascade sequence where a first boiler is brought online at its firing point and is then continuously modulated up to its maximum output, and then, the first boiler is maintained at its constant output while firing a second boiler which is then modulated from its firing point up to its maximum output as the overall heat demand on the system increases. In a similar manner, each boiler is brought up to its maximum output before the next adjacent boiler is fired, and all previously fired boilers are maintained at maximum output with the modulation for the system coming from modulation of the last fired boiler. While heater cycling is minimized, Paine falls short of addressing the issue of distributing flow to conserve energy.

In conventional cascade water heater systems, there often exists a significant disparity in usage between water heaters in a network. The order in which water heaters are turned on is fixed. A small demand causes a first water heater to turn on. As demand increases, more water heaters are turned on. As a result, the water heaters arranged to turn on first experience significantly higher accumulated usage than others, especially ones serving low demands. Water heaters experiencing higher accumulated usage require more regular preventative or unscheduled maintenance while others are underutilized. One attempt to solve such a problem is evidenced in water heaters marketed under the trade name "Eternal Advanced Hybrid Water Heating" by Grand Hall Enterprise, Ltd. The operator's manual labeled 157110293 and dated Jul. 4, 2009 introduces a host and sub concept in which a host unit is selected as the first unit to fire when demand for hot water is detected and it control multiple sub units. According to "Specifications and Features" (page 3) and "MCU Operational Sequence Flow Chart" (page 8) sections of this operator's manual, the designation of a water heater controller as the host is changed every 24 hours in order to distribute wear and tear across all units in a networked system.

Paine further discloses a scheme in which each boiler includes a controller and may serve as a lead boiler and its controller as the master controller. The role of lead boiler is periodically rotated between each of the boilers in the system so as to substantially equalize the number of operating hours experienced by each boiler. The practice of using operating hours alone as a measure to estimate a water heater's remaining life is fraught with uncertainties since there are other significant factors affecting the water heater's remaining life. In use, a water heater delivers an amount of hot water at a temperature over a period of time. Given a fixed number of operating hours, the damage done to a water heater used to deliver water at 140 degrees Fahrenheit is substantially different than the damage done to a water heater used to deliver water at 102 degrees Fahrenheit. Based on this premise, the Applicants believe that there exists a need for an improved or more accurate method of estimating remaining life to efficiently control water heaters in a networked or cascaded system.

Applicant disclosed its novel cascading water heater system and method in non-provisional application U.S. Ser. No. 12/699,487 filed Feb. 3, 2010. This continuation in part application discloses more particularly certain details of the invention and more particularly claims the subject matter the inventors regard as their invention with respect to the masterless control scheme.

SUMMARY OF THE INVENTION

This foregoing need is satisfied by a masterless control method for heating devices operably connected in a network. In this novel method, each of the heating devices has a controller which communicates to other heating device controllers within the network via a communication bus. Each controller maintains at least one list of usage planning data. The method comprises steps of: (a) configuring each controller to periodically broadcast, at an interval, a message with an identification number (ID) and at least one usage planning data item; (b) configuring each controller to listen to and receive messages from external controllers on the communication bus; and (c) configuring each controller to set a timer upon receiving a message from one of the external controllers. The timer is associated with of one external controller and when it expires, the usage planning data associated with the external controller is removed from the list of usage planning data and if the usage planning data associated with the external controller is received prior to the expiration of the timer, the usage planning data is retained and the timer is reset and restarted.

The present device overcomes the shortcomings of the prior art by providing one or more structures and methods for controlling water heaters in a networked or cascade system. In accordance with the teachings of the present invention, there is provided a method for controlling a plurality of fluidly and operably connected water heaters in a network to meet a system demand. In one aspect, the method uses overall efficiency and usage history as two primary factors in determining the heating load a water heater is required to provide in order to meet the system demand.

A unique masterless control scheme is provided to enable the processes of seamlessly adding a water heater to or removing a water heater from and assigning a heating load to a water heater in a fluidly and operably connected water heater network, wherein each water heater of the network has a controller which communicates with other water heater controllers within the network via a communication bus and each controller maintains a list of usage planning data. A master controller is thus rendered unnecessary. In another aspect, the present method comprises the steps of supplying power to each water heater of the network, configuring the controller of each water heater to broadcast a message to a communication bus of the network, wherein the message includes an ID and usage planning data, configuring the controller of each water heater to listen to and receive messages from other controllers on the communication bus, reconciling the list of usage planning and sorting the list based on a predetermined key to produce a sort result, executing a function based on the sort result and configuring the controller of the water heater to update its usage planning data.

Accordingly, it is a primary object of the present invention to provide a masterless system and method for controlling a masterless network of devices, wherein the devices of the network cooperate to meet one or more system requirements. In the present embodiment, the devices are water heaters.

It is another object of the present invention to provide a cascade water heater control system that maximizes thermal efficiency while minimizing disparity in wear across all water heaters in the system.

It is another object of the present invention to provide a cascade water heater control system that minimizes operating cost while minimizing disparity in wear across all water heaters in the system.

It is yet another object of the present invention to provide a cascade water heater control system that is plug and play, i.e., without having to use a master controller to configure or reconfigure the make-up of a network before the network can start or continue functioning.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification and claims. The present invention is capable of other embodiments and of being practiced and carried out in various ways. Also it is to be understood that the phraseology and terminology employed herein are for the purpose of description and should not be regarded as limiting.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

Figure 1:
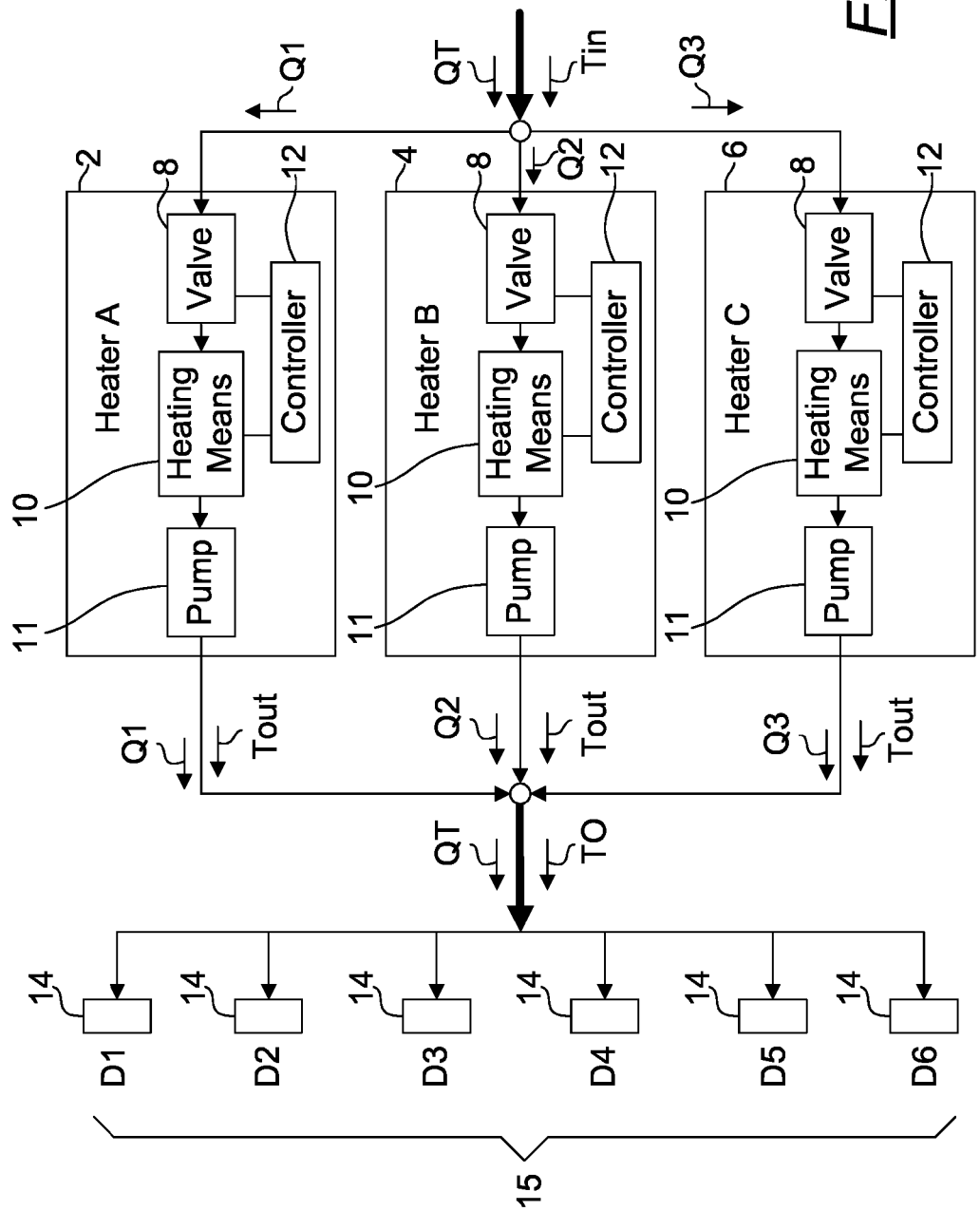
FIG. 1 is a block diagram illustrating a water heating system comprising a plurality of water heaters controlled using the present control system.

The drawings are not to scale, in fact, some aspects have been emphasized for a better illustration and understanding of the written description.

Parts List

2—first water heater
4—second water heater
6—third water heater
8—boiler or heating means
10—flow limiting valve
11—pump
12—water heater controller
14—point of demand
15—system demand
16—system demand requested at point or points of demand
18—communication bus
20—step of obtaining number of participating water heaters
22—step of obtaining average heating load
24—step of selecting participating water heaters based on relative remaining life
26—step of setting and activating participating water heaters to average heating load
28—list of relative remaining life of all water heaters in network
30—list of target output temperatures of water heaters in network
32—step of obtaining number of participating water heater valves sufficient to enable potential system flow
34—step of obtaining average valve setting for an individual water heater valve
36—step of selecting participating water heater valves based on relative remaining life
38—step of setting and activating participating water heaters to average individual valve setting
40—step of supplying power to a controller
42—step of broadcasting internal ID and usage planning data
44—step of listening to or receiving external ID and usage planning data
46—step of updating list
48—step of removing old data from list
50—step of sorting remaining data in list based on a key
52—step of executing a function based on sort result
54—decision to execute additional function
56—step of updating internal usage planning data
TI—input water temperature
TO—output water temperature
QT—total flow
Q1, Q2, Q3—individual flow through water heaters A, B and C

PARTICULAR ADVANTAGES OF THE INVENTION

In accordance with the present invention, a true masterless control scheme is provided. The present control scheme does not require physical setup of an identification number during installation nor does it require a master-slave designation which unnecessarily complicates the functional relationship of one water heater with other water heaters in a network. The ability to add or remove a water heater at will without disrupting the existing service is provided. Continuity of service is provided even when there is one or more water heaters that are non-functional or when one or more water heaters have been removed for service or repair. When such an event occurs, a water demand is met by redistributing heating load to the remaining functional water heaters. When necessary, additional water heaters may be added without disrupting existing water heating operation. Therefore, in contrast to a masterful system having a master controller or a back-up master controller, the present masterless control scheme avoids a single point of failure which can shut down an entire network of water heaters due to the failure of at least one water heater and/or water heater controller.

The present control method uses efficiency and usage history as two primary factors in determining the heating load a water heater is required to provide in order to meet a system demand. Thus, the usage is distributed amongst all water heaters connected in a network in order to minimize usage variation between individual units and maximize efficiency.

The practice of using operating hours alone as a measure to estimate a water heater's remaining life is fraught with uncertainties since there are other significant factors affecting the water heater's remaining life. In accordance with the present invention, the concept of normalized operating hours is used, where normalized operating hours represent expended energy, thermal cycle count, blower speed, flow rate, outlet-inlet water temperature difference, and the like.

In a fluidly connected network of a plurality of water heaters, the flow experienced in each water heater of the network is lower than the flow experienced in a system consisting of a single water heater if the flow through each water heater of the network is unrestricted. The flow rate experienced in a water heater in a network is a fraction of the total flow of a system. Therefore, a demand that is detectable in a single water heater system may not be detected by a flow sensor associated with a water heater in a network of water heaters. In accordance with the present invention, there is provided an ability to detect a small system demand in a plurality of fluidly connected water heaters.

DETAILED DESCRIPTION OF A PREFERRED EMBODIMENT

The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower).

Figure 2:
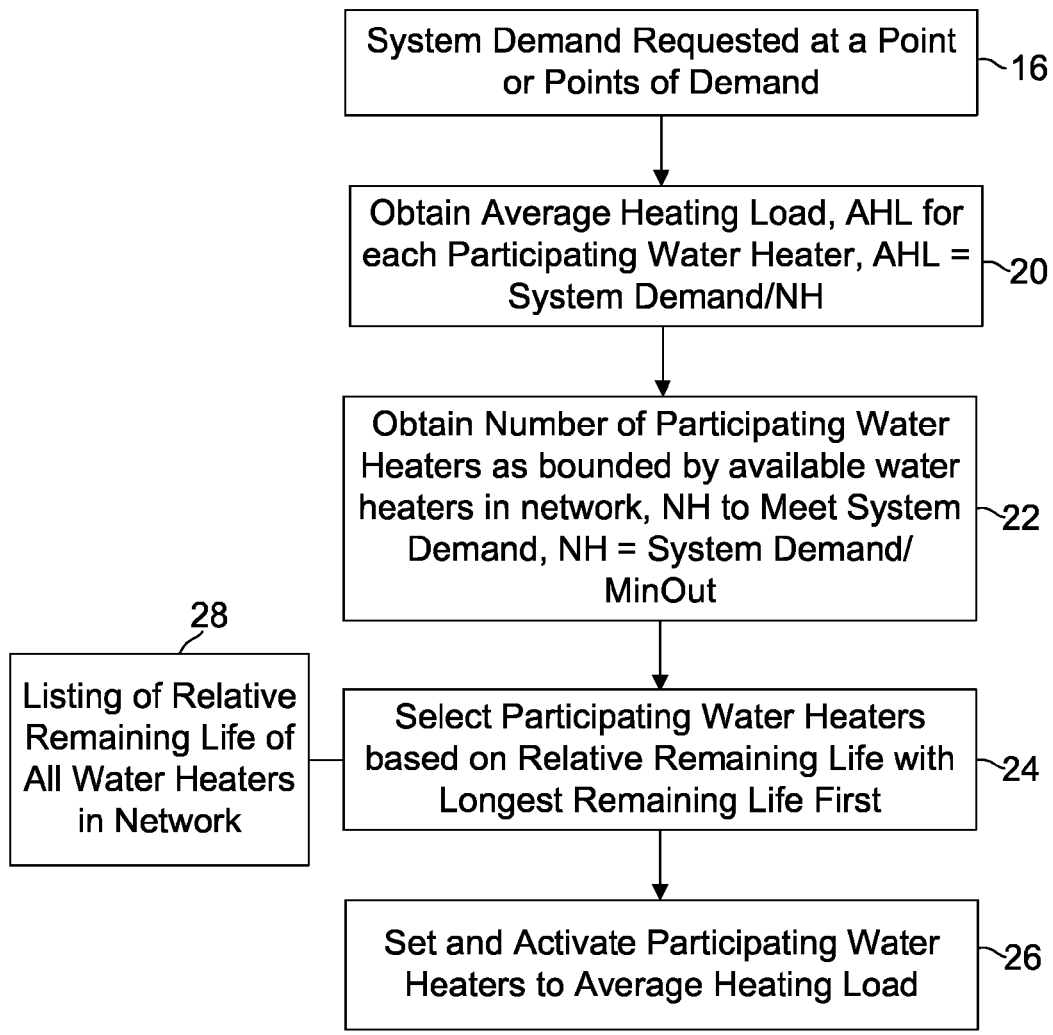
FIG. 2 is a flow diagram illustrating a novel method of the present control system used to assign heating load to all water heaters in a system including a plurality of water heaters.

As a general overview, and with reference to FIG. 2 in particular, there is provided a method for controlling a plurality of fluidly and operably connected water heaters in a network to meet a system demand. The method comprises the steps of: (1) providing a value corresponding to relative remaining life of each water heater of the network and a value corresponding to minimum output of each water heater of the network (step 16), (2) obtaining a number of participating water heaters required to service the system demand (step 20), (3) obtaining an average heating load (step 22), (4) selecting participating water heaters (step 24) and (5) setting and activating each of the participating water heaters at the average heating load (step 26) to provide a total load meeting the system demand. As will be described in greater detail with respect to the particular steps of the method, the method uses efficiency and usage history as two primary factors in determining the heating load that a water heater is required to provide in order to meet the system demand. In considering the efficiency of a water heating system, thermal efficiency, least cost option, or a weighted combination of thermal efficiency and least cost option may be contemplated.

The present control method is illustrated and described with reference to FIG. 2. However, for a better understanding of the present control method, it is instructive to describe a networked water heater system as shown in FIG. 1, in which the control method may be used.

FIG. 1 is a block diagram illustrating a water heating system comprising a plurality of water heaters 2, 4, 6 controlled using a novel control system (described in greater detail below with reference to FIGS. 2-4). Referring to FIG. 1, three water heaters 2, 4, 6 (also designated A, B, C on FIG. 1) are connected in parallel configuration such that a system demand 15 is cooperatively met by the flows Q1, Q2 and Q3 of water heaters 2, 4 and 6 respectively. A total of six points of demand D1, D2, D3, D4, D5 and D6 are shown in this figure, which cumulatively form the system demand 15. However, it is to be understood that the example presented herein is for illustrative purposes only. Any number of water heaters, flow limiting valves and pumps may be controlled using the present control system and any number of points of demand 14 may be used, provided that the combined heating capacity of the system is sized appropriately to meet demand. For example, a small motel may only have ten points of demand for ten guest rooms while a large hotel may have five hundred points of demand for five hundred guest rooms.

Each of the water heaters 2, 4, 6 comprises a flow limiting valve 10, a pump 11, at least one heating means 8 and a controller 12. The fluid flow through each flow limiting valve 10 can be altered from zero flow to a flow corresponding to a fully open (maximum flow) valve setting. The heating means 8 is typically a burner, a combined blower and burner unit or an immersive electric element, however the control system is not so limited. Any known or well developed means (where a demand can be met in a reasonable amount of time) of heating hot water may be suitably adapted to the present system. There are numerous ways to provide hot water. Residential and commercial applications typically use gas or electric water heaters or a combination thereof. A gas water heater typically uses a burner to generate heat and a heat exchanger to transfer the generated heat to the water supply demanded by a user. Traditionally, a large reserve tank is used to hold a large volume of heated water in anticipation of a hot water request. If a request is not imminent, heat energy is unnecessarily lost to the surroundings and wasted. Recently, tankless water heaters have gained popularity due to concerns of high energy costs and depletion of energy sources.

In a tankless water heater, a demand of hot water is met by near instantaneous heating of water. Little is wasted as water is heated only a very short time before it is used. A tankless water heater comes in a variety of configurations. A high efficiency model typically comes with a blower with or without blower speed control. The use of an electric blower is common in heaters involving inverted burners where hot combustion gases are forced down against gravity through a heat exchanger coil.

An electric water heater, on the other hand, typically comprises an immersion heating coil which comes in direct contact with a body of water to be heated. Even though the ensuing discussion focuses on a control system designed for tankless water heaters, each comprising a variable speed blower, a flow limiting valve and a pump, it is to be understood that the present inventive concepts are applicable to water heaters of other modes of heating or having equivalent control instruments.

For the purposes of the following examples, a combined blower and burner unit will be used. In use, when the system demand 15 becomes non-zero, a cold water flow with a flow rate of QT and temperature of Tin is established upstream of the water heaters 2, 4, 6. This total cold water flow rate QT is made up of individual flows with flow rate of Q1, Q2 and Q3 which are fed through water heaters 2, 4, 6 respectively, to be heated to temperature Tout. Flow rates Q1, Q2 or Q3 are sized based on the heating load assigned to water heaters 2, 4, 6 by their respective controllers 12. The method by which each water heater is assigned a heating load constitutes one aspect of the present invention. The heating load assigned to each heater directly corresponds to the flow allowed to flow through each heater.

Referring again to FIG. 1, flow rate control is further aided with the use of a pump 11 connected inline with a flow limiting valve 10. Typically, a tankless water heater is equipped with a pump and internal flow configuration that are capable of cycling water internally within the internal plumbing of the water heater to deliver output water at a desired temperature. In cases where a pump is not used for internal recirculation, the present method may optionally and additionally include the step of activating the pump to increase flow rate. In cases where the act of opening the flow limiting valve alone is insufficient in increasing a flow to a desired flow rate quickly due to limited water pressure, the method may optionally and additionally include the step of activating a pump to increase flow rate to expediently bring the flow rate to the desired level.

FIG. 2 is a flow diagram illustrating a novel method of the present control system used to assign load to all water heaters in a system. The system has a plurality of water heaters that are interconnected operably, fluidly and electronically in a network. The present method utilizes overall efficiency and remaining life as keys to assigning load to water heaters of the network. Heating load is assigned based on a distribution of heating load which maximizes overall efficiency of the networked water heaters and minimizes disparity in remaining life across all water heaters in a network.

In the control aspect, the present method uses a novel true masterless control scheme, wherein each controller of the network is responsible for determining the actions its corresponding water heater has to take to fulfill a system demand. Although a master-slave control system, which is commonly used in prior art cascade water heating systems may be used to benefit from the present method of assigning heating load to each water heater, the benefits of using a true masterless control scheme will become apparent in discussions pertaining to FIGS. 2A, 2B, 2C and 4.

In one aspect, thermal efficiency is a measure of the amount of thermal energy output versus thermal energy input. In systems where the primary energy consuming equipment is a gas burner, thermal efficiency is a suitable representation of the overall efficiency. The thermal energy output of a burner unit is a measure of the work done to increase the temperature of an amount of water by a certain number of degrees C. or F. The thermal energy input in a burner unit is a measure of the heat content of a fuel that is consumed in order to produce a thermal energy output. In any burner based systems, there exists an operating point that corresponds to a condition where the highest thermal efficiency is achieved. It has been discovered that thermal efficiency is inversely proportional operating capacity, i.e., the flow rate. As flow rate increases, the thermal efficiency of a burner system drops. In order to achieve maximum thermal efficiency, the smallest flow rate is desired. However, a typical water heater is capable of detecting a flow only if its flow rate rises above a certain threshold. Therefore, there exists a minimum flow rate or output requirement which must be met before the flow rate of a water heating system can be meaningfully modulated. The heat load related to this minimum flow rate is termed minimum heat load hereinafter.

In another aspect of this embodiment, overall efficiency is the least cost option. In a heating system comprising various energy consuming components, energy usage is not limited to a single mode. For instance, a combined gas burner and blower system consumes both fuel energy and electric energy. As another example, a combined gas burner and immersive electric element system also uses both fuel and electric energy. Furthermore, it is well known that the cost per unit electrical energy can differ tremendously from the cost per unit thermal energy. The per unit cost for each mode of energy can also change daily depending on its market value at a given time. Therefore, the practice of optimizing heating load distribution based merely on thermal efficiency alone may not meet consumer objectives. In this aspect of the embodiment, the control method utilizes a heating distribution means based on least operating cost. As an example, in a cascade system having two water heaters, a system demand which can be met using one water heater alone may be equally distributed to both water heaters. In accordance with the least operating cost strategy, the decision to use one or both water heaters is based on the expected total operating cost of using one as compared to two water heaters to meet the same system demand.

As used herein, the terms "remaining life" shall be defined as a measure indicating the amount of useful life a water heater has until a repair, maintenance or replacement is required, or anticipated to be required based on statistical data. The remaining life of a water heater is inversely proportional to the amount of "damage" which has been inflicted upon the water heater. Water heater damage is affected by various factors related to the normal operation, such as, for example, the expended energy, thermal cycle count, deltaT, flow rate and blower speed associated with each water heater. The expended energy is defined as the cumulative energy (for example, thermal and electrical) consumed in operating a water heater. The thermal cycle count is defined as the number of events where the flow rate through a water heater changes by 1.5 gallons per minute ("gpm"). deltaT is defined as the difference between heater outlet and inlet temperature. To further illustrate, damage at any given time is calculated as the addition of scaled sum of energy expended raised to the power X, scaled sum of thermal cycle count raised to the power Y and scaled sum of blower speed multiplied by flow rate and deltaT raised to the power Z over time, where X, Y, Z, A, B, C are factors specific to a water heater or a system having a plurality of water heaters.

$$\text{Damage} = A * (\text{sum of(energy expended)} \wedge X \text{ over time}) +$$
$$B * (\text{sum of(thermal cycle count)} \wedge Y \text{ over time}) +$$
$$C * (\text{sum of(blower speed} * \text{flow rate} * deltaT) \wedge Z) \text{over time})$$

Referring again to FIGS. 1 and 2, a system demand 15 is first requested as shown in step 16 at one or more points of demand 14. Upon detecting a system demand, each controller 12 executes a series of steps to determine the amount of heating load it needs to provide to achieve both maximum overall efficiency and optimal usage distribution.

In Step 20, the number of participating water heaters required to meet the system demand 15 detected in step 16 is determined. The number of participating water heaters is obtained by dividing the system demand 15 by the minimum output of each water heater. For instance, if the system demand 15 is 10 gpm and the minimum output of each of the water heaters is 1 gpm, the number of participating water heaters would be ten if there are ten or more available water heaters in the network. Using the overall efficiency method based on thermal efficiency, the demand would be met by using as many water heaters as possible. If there are five available water heaters, the number of participating water heaters would be limited to five. However, if the system demand 15 is 3 gpm and there are five available water heaters, the number of participating water heaters would then be three since each of the water heaters is capable of providing a minimum heating load of 1 gpm to meet a total of 3 gpm system demand. In such a case where there is at least one water heater that is not required to be turned on, the dormant water heater becomes a "reserve water heater." When a reserve water heater exists, various measures may be taken in anticipation of an increase in demand such as starting internal and/or external recirculation circuit of a tankless water heater to minimize a delay in delivering hot water to a demand point and the like.

In step 20, if the least cost option is selected, the system demand will be satisfied by using a group of participating water heaters such that the system would incur the lowest operating cost. In one embodiment, the controller of each water heater calculates the expected total operating cost of operating one or more water heaters to meet a system demand based on the operating parameters of the water heater it controls. In another embodiment, the controller of each water heater calculates the expected total operating cost of operating external water heaters based on operating parameters received from external water heaters.

Upon determining the number of participating water heaters, an average heating load is determined. Step 22 involves calculating the average heating load of a participating water heater. The average heating load is obtained by dividing the system demand 15 by the number of participating water heaters.

Block 28 represents a list of relative remaining life of all water heaters retrieved from a memory location functionally connected to the controller of a water heater. In Step 24, participating water heaters are selected from all water heaters in the network. This step is achieved by selecting the required number of participating water heaters from those water heaters having the longest remaining life. For instance, assume the number of required participating water heaters to be three. There are five water heaters 1, 2, 3, 4, 5 having remaining life values of L1, L2, L3, L4 and L5 respectively:

L1 is less than L2,
L2 is less than L3,
L3 is less than L4, and
L4 is less than L5.

In this case, then L3, L4 and L5 would be selected as participating water heaters in Step 24 since they possess longer remaining life as compared to L1 and L2. In cases where remaining life values are similar in magnitude or where differences are insignificant, the selection of water heaters may be based on a water heater's ID. For instance, the IDs of water heaters may be sorted based on alphabetical and/or numeric comparisons. A water heater controller with an ID associated with a larger returned result upon at least one of the above comparisons may be selected first or vice versa.

In Step 26, each water heater's controller identifies whether it is one of the selected participating water heaters by comparing its ID to the ID associated with each participating water heater. If a positive identification is returned, the water heater is turned on or activated to meet the system demand by supplying the average heating load to the system.

In accordance with the present invention, the control system uses a true masterless control scheme which does not require physical setup of an identification number during installation nor does it require a master-slave designation which unnecessarily complicates the functional relationship of one water heater with other water heaters in a network. The concept of rotating the role of lead water heater in a multiple water heater setup is not new. Paine discloses such a scheme in which each boiler includes a controller and may serve as a lead boiler and its controller as the master controller. The role of lead boiler is periodically rotated between each of the boilers in the system so as to substantially equalize the number of operating hours experienced by each boiler. A substantially similar strategy is employed by Grand Hall Enterprise, Ltd. in its "Eternal Advanced Hybrid Water Heating." The operator's manual labeled 157110293 and dated 2009, Jul. 4 introduces a host and sub concept in which a host unit is selected as the first unit to fire when demand for hot water is detected and it controls multiple sub units. In this setup, the designation of a water heater controller as the host is changed every twenty four hours in order to distribute wear and tear across all units in a networked system. Each controller of this setup is equipped with a dipswitch which must be physically or correctly set prior to use in order to distinguish one controller from another. The present control method improves upon the prior art by removing the need for such a manual step which is not only time consuming but also costly due to the additional hardware required and prone to installation error.

A true masterless control scheme of the present invention enables the addition of a water heater simply by connecting the water heater fluidly to all existing water heaters in the network and connecting the water heater's controller 12 to a communication bus 18 shared by all existing water heater controllers 12 in the network. The true masterless control scheme further enables the removal of a water heater from service in the network simply by disconnecting the water heater fluidly from the network and disconnecting the water heater's controller from the communication bus shared by all existing water heater controllers in the network. Each controller 12 of a water heater in a true masterless control scheme is responsible for determining the actions the water heater is required to take to fulfill a system demand, thereby simplifying the setup of a water heater network and minimizing the potential for setup errors.

Figure 2A:
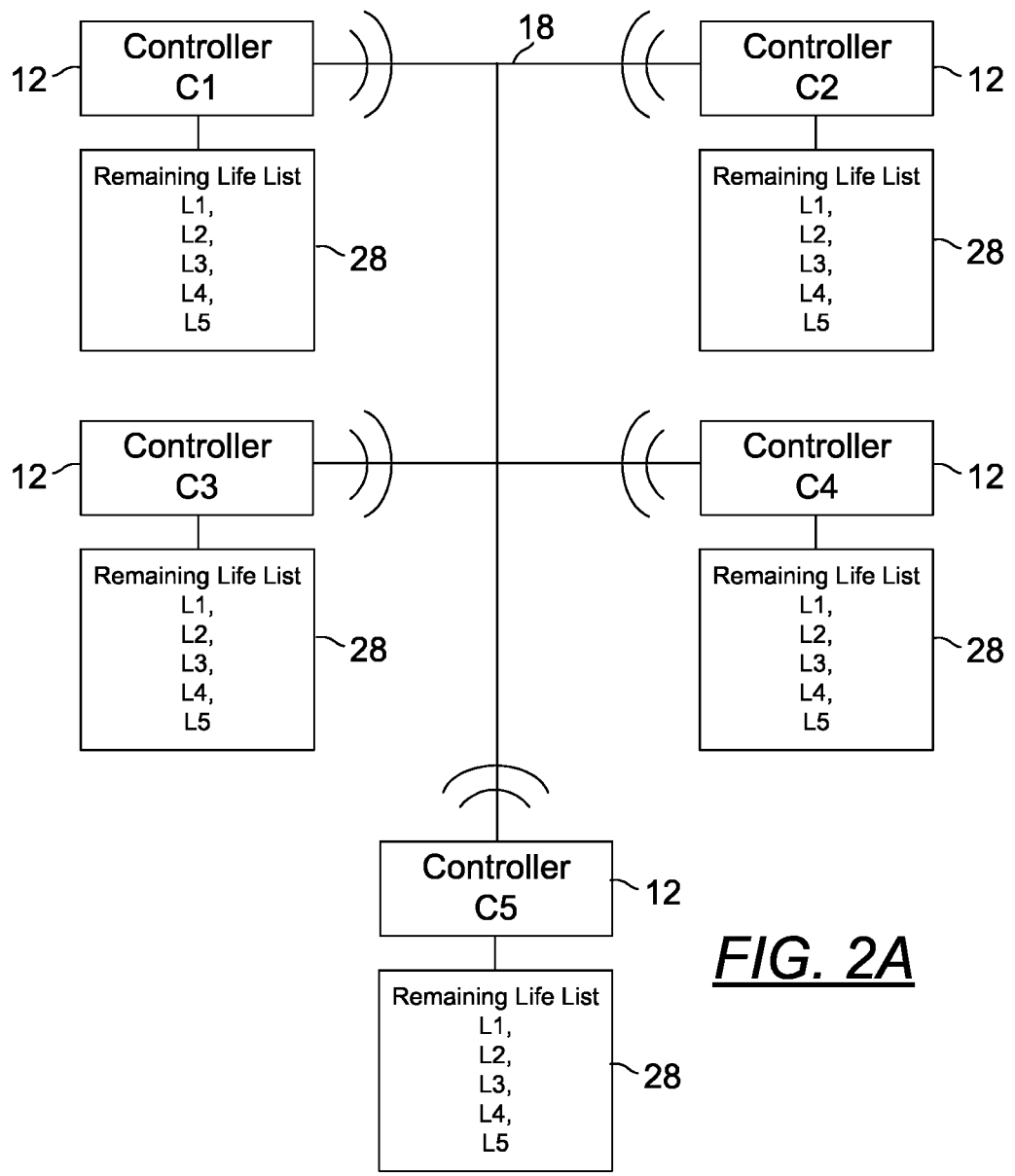
FIG. 2A is a block diagram depicting the communication layout of networked water heater controllers using the present masterless control scheme.

FIG. 2A is a block diagram depicting the communication layout of networked water heater controllers using a novel masterless control scheme. Continuing on the example of five water heaters above, it shall be noted that there are five water heater controllers 12, each operably connected to a water heater. Each controller 12 is responsible for maintaining a list of remaining life data 28 in a location of a persistent memory integral or external to the controller. Each controller 12 is pre-programmed to track its own remaining life data and the remaining life data of other water heaters in the common communication bus 18. Upon receiving power, each controller 12 executes a program similar or identical to the programs executed in other water heater controllers 12 in the same bus 18. Each controller 12 is pre-programmed to broadcast the remaining life at a predetermined interval. For instance, a broadcast can be configured to occur once every unit of remaining life has been consumed. In one embodiment, a unit of remaining life is an hour. Upon broadcast from one controller 12, all other controllers on the bus 18 will receive and update their respective lists 28. In this example, each controller 12 receives four external remaining life values from four external controllers 12. Its own remaining life value is added to the list such that the list 28 is complete. For instance, controller C3 receives L1, L2, L4 and L5 from broadcasts made by C1, C2, C4 and C5. L3, which is tracked internally in C3, is added to the list such that proper comparisons can be made to determine the participating water heaters for a given demand.

Figure 2B:
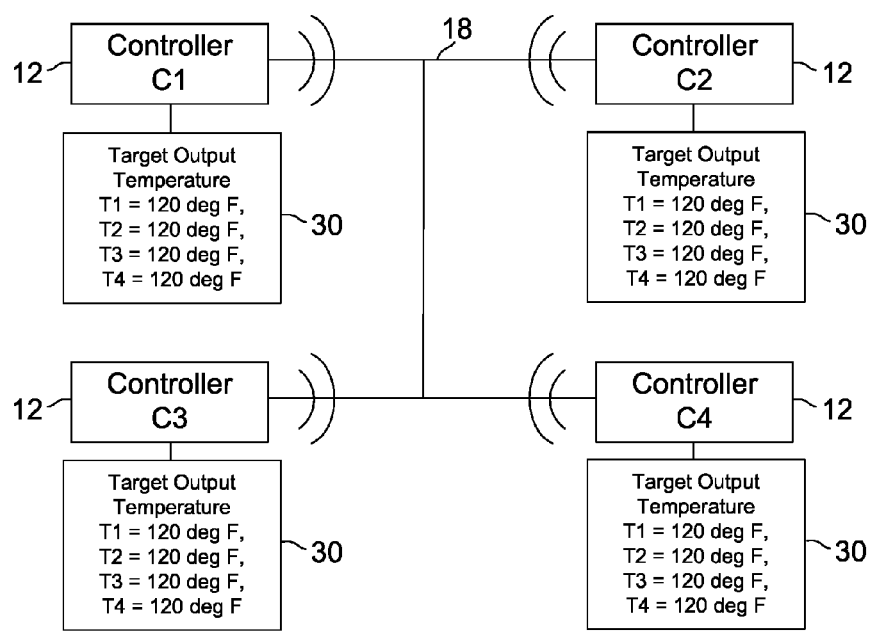
FIG. 2B is a block diagram depicting the broadcast of target output temperature from each water heater controller in the present masterless control scheme.
Figure 2C:
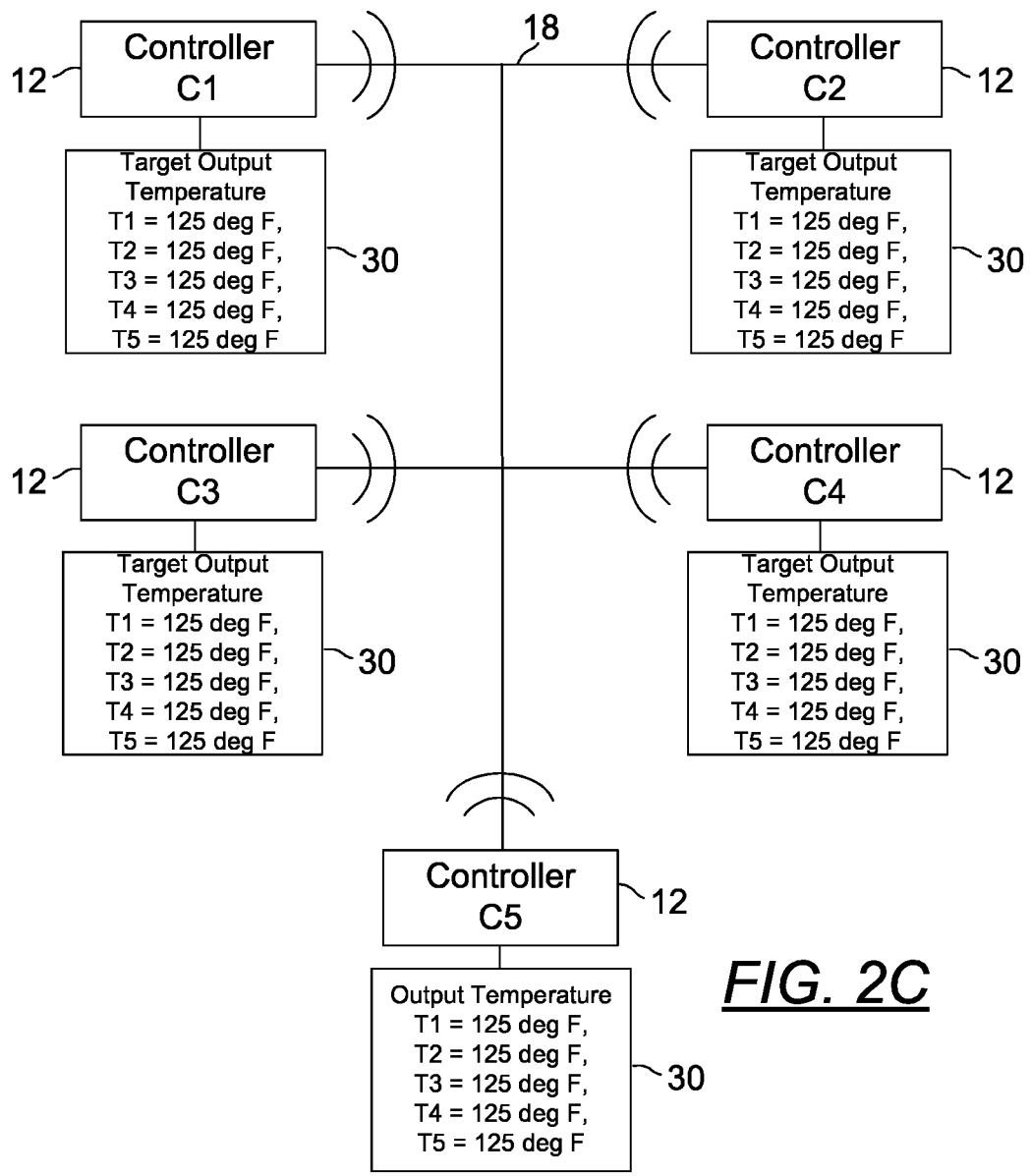
FIG. 2C is a block diagram depicting one embodiment by which an operating parameter is updated in the present masterless control scheme.

It is imperative for water heaters connected in a fluid network to heat water to the same target output temperature setting. Therefore there must be a common target output temperature in a network of water heaters. FIG. 2B is a block diagram depicting the broadcast of target output temperature from each water heater controller in the present masterless control scheme. FIG. 2C is a block diagram depicting one embodiment by which an operating parameter is updated in the present masterless control scheme.

The target output temperature of a water heater is typically factory preset. However, it may be set to various levels depending on the need of the end user. For instance, a laundromat may require a higher water temperature setting than hotel rooms. Therefore it is not uncommon for a water heater controller to be installed in a field location where factory settings are not suitable and must be modified. Referring to FIG. 2B, the target output temperature of each water heater controller, T1, T2, T3, T4 is set to 120 degrees F. as shown in lists 30. Referring to FIG. 2C, an additional water heater controller, i.e., controller C5 having a target output temperature of 125 degrees F. is now added to network bus 18. As depicted, upon detecting a discrepancy between the target output temperature of an external source, a water heater controller modifies its own target output temperature setting with the target output temperature of the external source. Eventually, all water heater controllers C1, C2, C3, C4, C5 adopted the new target output temperature of 125 degrees F. Therefore, in accordance with the present masterless control scheme, the target output temperature may simply be effected by inputting a new target output temperature via a display panel and an input device (such as a keyboard or touch pad) that are operably connected to a controller 12. Upon receiving a broadcast from each water heater controller with this updated target output temperature value, the entire list of water heaters now has target output temperature value of 125 degrees F. Therefore, in the present control scheme, the settings of the latest broadcast message are selected as the common operating value. It shall be understood that other methods of selecting a common operating value may be adopted.

Figure 3:
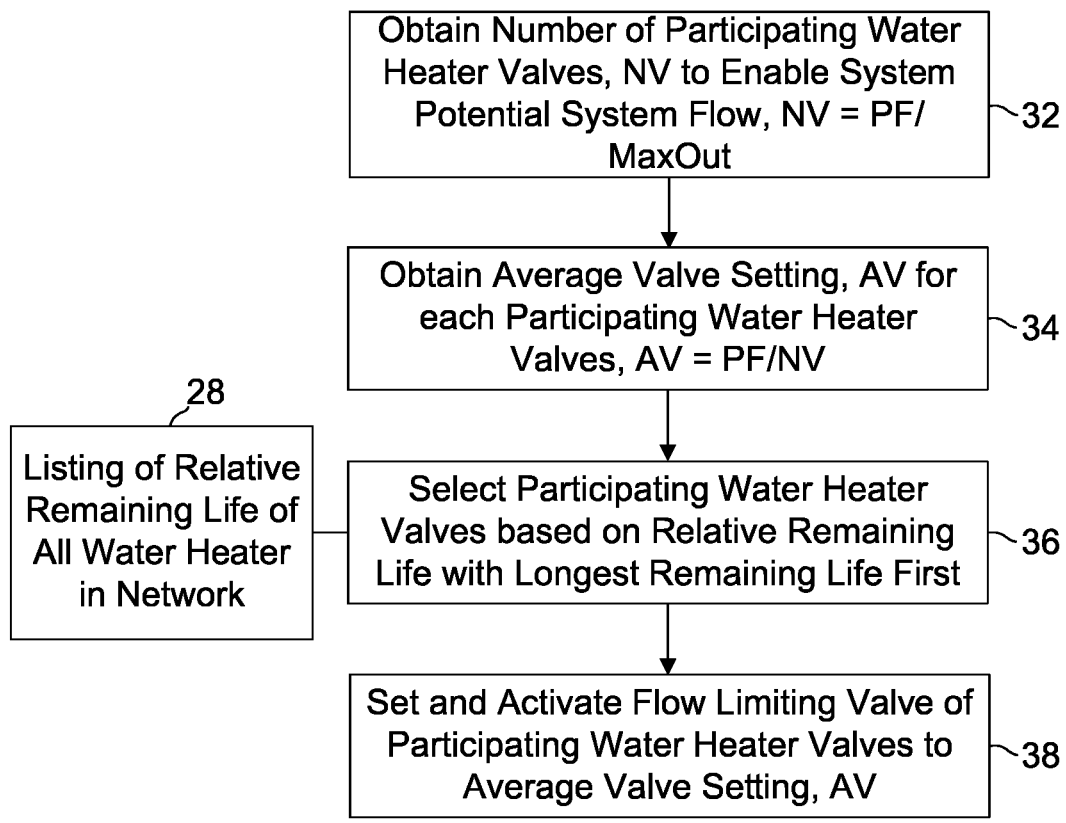
FIG. 3 is a flow diagram illustrating a novel method of the present control system used to detect a small hot water demand in a system including a plurality of water heaters.

FIG. 3 is a flow diagram illustrating a present control system method used to detect a small hot water demand in a system with a plurality of water heaters. Typically, a water heater is equipped with a flow sensor capable of detecting a flow rate above a minimum threshold. In a fluidly connected network of a plurality of water heaters, the flow experienced in each water heater of the network is lower than the flow experienced in a system consisting of a single water heater if the flow through each water heater of the network is unrestricted. The flow rate experienced in a water heater in a network is a fraction of total flow of a system. Therefore, a demand that is detectable in a single water heater system may not be detected by in a network of water heaters.

The present control method enables fluidly connected water heaters to detect a demand having a flow rate equal or greater than the minimum detectable threshold of a water heater, in particular water heaters having a flow limiting means, such as that provided by a flow limiting valve. When the water heaters of a network are first turned on or when a system demand has ceased or when a demand has dropped below a predetermined limit, a control program is executed to prepare for the detection of the next small system flow.

In Step 32, the number of participating water heaters required to meet a potential system flow is determined. In order to calculate the number of participating water heaters, a potential system flow needs to be provided. A potential system flow is defined as a typical starting flow that is predetermined based on an expected usage habit of the water heating system. The number of participating water heaters is determined by dividing the potential system flow by the maximum output of a water heater in the network. For instance, if the potential system flow is 9 gpm and the maximum output of a water heater in the network is 5 gpm, the number of participating water heater is then determined to be two.

In Step 34, an average valve setting for each participating water heater is determined. The average valve setting is obtained by dividing the potential system flow by the number of participating water heaters. Continuing on the foregoing example, the average valve setting is determined to be 4.5 gpm.

In step 36, participating water heaters are selected from the network. This step is achieved by selecting a number of water heaters having the longest remaining life with reference to a list 28 of relative remaining life of all water heaters retrieved from the persistent memory previously disclosed. Upon identifying the flow limiting valves whose valve setting needs to be adjusted, step 38 proceeds to set and activate the valve setting of the identified flow limiting valves to correspond to 4.5 gpm each.

Figure 4:
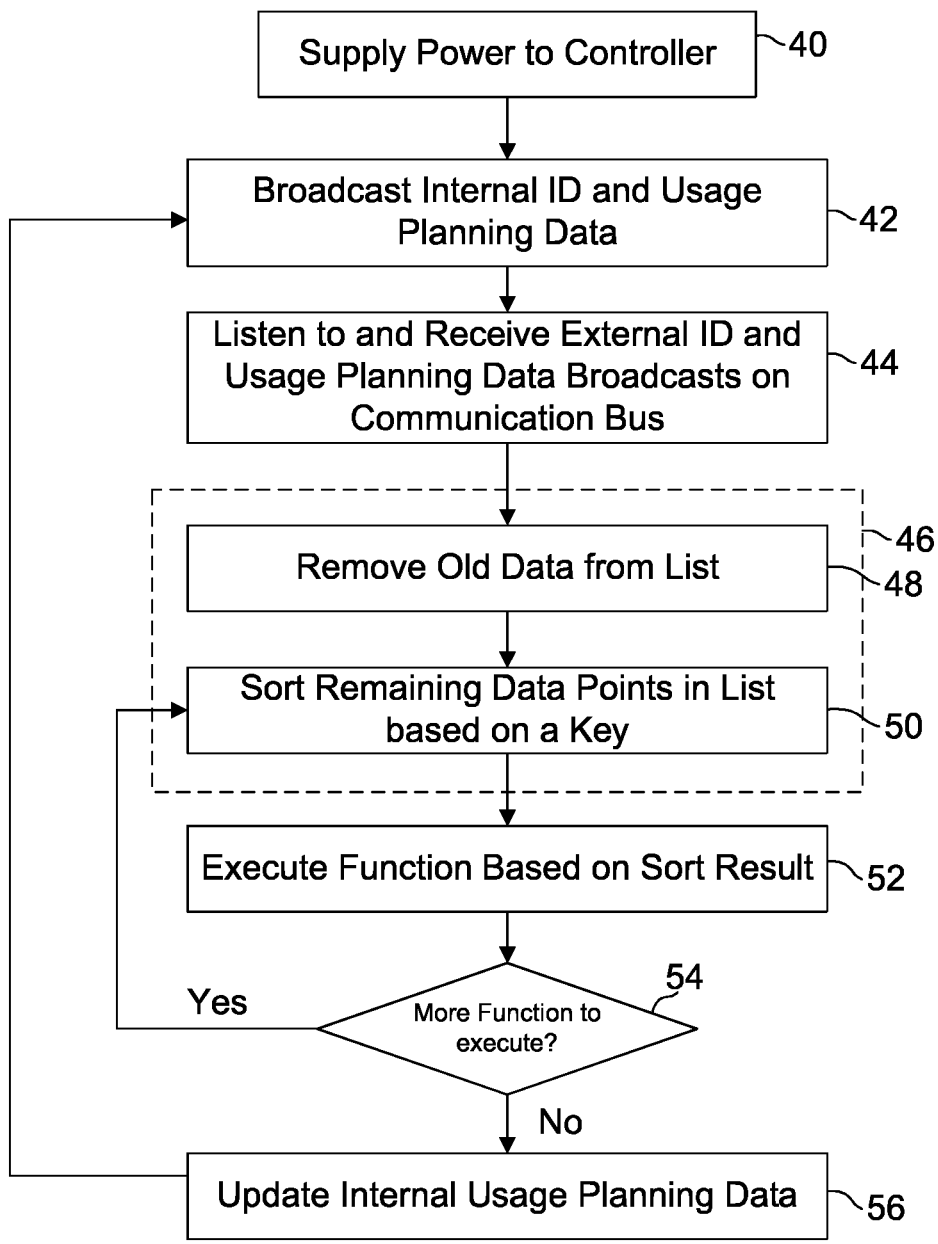
FIG. 4 is a flow diagram illustrating a novel method of the present control system used to enable seamless addition or removal of a heater in service and heating load distribution to water heaters.

FIG. 4 is a flow diagram illustrating a present control system method used to enable seamless addition or removal of a heater in service and heating load distribution to water heaters. A plurality of water heaters is fluidly connected and the controller of each of the plurality of water heaters is operably connected in a network. Each controller is preferably equipped with a communication means common to all controllers on the network that communicates via a common bus. An exemplary protocol commonly used in the industry is the Modbus protocol communicated over a serial EIA-485 physical layer. Other communication protocols supporting hostless communication, such as Controller Area Network (CAN) or Ethernet and their supporting hardware may also be suitably adapted to perform the intended function. The communication bus is established via hard-wire connection or wireless means.

The ensuing description will be presented from the perspective of a control algorithm running in a controller. When electrical power is supplied to a controller (step 40), a program routine is started where the controller starts making one or more broadcasts to the communication bus. Step 42 depicts the broadcast of a message comprising an internal ID used to identify the controller from which the message originates and a set of usage planning data. In one embodiment, the set of usage planning data comprises a relative remaining life value, a target output temperature, a real-time clock time, programmed water heater turn-on time and duration, an error code, a maximum output of each broadcasting controller 12, or combinations thereof. A programmed water heater turn-on time and duration include the absolute time (as indicated by the real-time clock) at which a water heater is configured to be activated for the duration specified or until the real-time clock time indicates a specific time after the duration has elapsed. In one aspect, activation of a water heater is defined as simply turning on an internal recirculation circuit (or forcing a flow in an internal recirculation circuit) to aid in conditioning the water temperature in an internal recirculation loop. Reference is made to Applicant's co-pending application publication U.S. Pat. Pub. No. 2010/0195991 for an internal recirculation circuit, wherein the entire disclosure of the application is hereby incorporated by reference in its entirety. In another aspect, activation of a water heater is defined as turning on the burner, blower and internal recirculation circuit to add heat to water circuits in the network of water heaters. An error is reported to mark the type of error encountered in a water heater. This error code may be communicated to other water heaters to activate a specific failsafe procedure or to initiate a specific shutdown sequence. Continuing on the example of FIG. 2A, there will be a total of at least five broadcast messages on the communication bus in every cycle, i.e., one from each controller 12. In one embodiment, the ID is a factory-set serial number unique to a controller. The serial number can be any numeric or alphanumeric strings. The message comprises pertinent information which all the controllers in the network require to determine heating load distribution and to handle the actions of the network of water heaters as a system.

This is followed by step 44 where the communication bus is listened to and broadcast messages from external controllers are received. Identical to the internal outgoing broadcast message format, each external message also comprises an ID and a usage planning data set. Upon receiving external messages, each controller parses pertinent information and inserts such information into one or more list it maintains. In one embodiment, the ID and relative remaining life value are harvested from each message and put on such list.

In step 46, the list is reconciled by removing expired data points from the list. A timer is started the first time a broadcast message from an external source is received. The timer is specific for the external source as each external source or water heater controller is identified by an ID. Therefore, for a network of five water heaters, there will be four (five water heaters minus one for the current water heater itself) timers. A data point harvested from a broadcast message received from an external source and inserted into a list is therefore retained for a predetermined amount of time. Upon expiration of this predetermined amount of time (or timer), the data is removed from the list (step 48). However, if a new message is received from a water heater whose ID exists in the list, the current data point of the water heater with the ID will be replaced by the data point parsed from the new message and the timer is reset and restarted. As such, a water heater which has just become unavailable will be removed from the list while a newly added water heater to the network or an existing available water heater will remain and acknowledge its active state by broadcasting messages. The predetermined amount of time must be longer than the predetermined interval at which usage planning data is broadcast such that under normal operating conditions, the timer corresponding to this predetermined amount of time does not prematurely expire to cause a valid data point to be removed. In one embodiment, this predetermined amount of time is about 5 seconds and the predetermined interval is about 0.02 second (or 50 Hz).

Upon finishing reconciliation of the list's data points, the controller proceeds to sort the remaining data points (step 50) in the list based on a preprogrammed key. In one embodiment, the preprogrammed key is the relative remaining life. When sorting is complete, the list is ordered such that the data points are arranged in an ascending or descending order based on the relative remaining life. The controller then proceeds to execute a pre-designated function based on the sort result (step 52). In one embodiment, the pre-designated function is responsible for assigning a heating load to a water heater. The controller further determines whether another function is pending (step 54). If a pending function exists, the sorting step 50 is repeated with a preprogrammed key. If no additional functions are pending, the controller proceeds to update the usage data that belongs to the water heater it controls (step 56) and any newly received external data points. This check is important to avoid a race condition or executing one or more functions of a set of functions using one data point and another one or more functions of the set of functions using a newly updated data point. A race condition is an anomalous behavior due to unexpected critical dependence on the relative timing of events. The series of steps of FIG. 4 is then repeated where the broadcast step 42 is again executed.

The present masterless control scheme eliminates the need for physical setup of an ID during installation and eliminates the need for a master-slave designation which unnecessarily complicates the functional relationship of one water heater with other water heaters in a network or with the master controller. The ability to add or remove a water heater at will without disrupting the existing service is provided. Continuity of service is provided even when there is one or more water heaters that are non-functional or when one or more water heaters have been removed for service or repair. A failed water heater may simply seize to broadcast and be functionally removed from the network or ignored by other water heaters of the network. A failed water heater may also broadcast an error code such that remaining functional water heaters may take appropriate actions based on the error code. In certain cases where shared (or common) venting of flue (or exhaust) gas is present, the blower of a failed water heater is kept on to aid in venting of flue gas from other functional units and to prevent inadvertent flue gas flow into the failed water heater's combustion chamber. When a water heater fails, a water demand is met by distributing heating load to the remaining functional water heaters. The failed water heater is configured such that its valve is disposed in a position for remaining operating water heaters in the network to still meet immediate and future heating demands. For example, if the networked water heaters are disposed in a parallel configuration as depicted in FIG. 1, the valve 10 of a failed water heater 2 may be closed to allow water flow to be diverted to other functional water heaters 2. Referring back to FIG. 2C, in case of a failed communication module of a controller 12 or a severed communication line connecting a controller 12 of an otherwise functional water heater 2 to a bus 18, the controller will function as if it is not connected to the network bus 18 or function as a single independent unit. This water heater 2 is therefore able to contribute in meeting a network-wide heating demand although it has seized to communicate with other controllers 12 in the network.

Similarly and when necessary, one or more water heaters may be added without disrupting existing water heating operation. It shall be apparent that the disclosed masterless concept can be applied to any control systems where control decision is based on one or more conditions of each discrete device of the network and each of the devices contributes a portion of energy to result in a total amount of energy which meets a demand. In the example above, the general condition relied upon is called "usage planning data" while more specific examples of the usage planning data include a relative remaining life value, a target output temperature, a real-time clock time, programmed water heater turn-on time and duration, an error code, a maximum output of a water heater, and combinations thereof. Therefore, systems such as a network of boilers, thermal driers, air heaters, fluid heaters, solids heaters, combined heat and power systems, combined cooling, heat and power systems, cooling systems, chillers and freezers may readily take advantage of the present masterless control scheme as the performance of each of these devices is closely tied to the remaining life of the devices and other related factors. Reference is made to Applicant's co-pending application publication U.S. Pat. Pub. No. 2011/0041781 for an example of a combined heat and power system, wherein the entire disclosure of the application is hereby incorporated by reference in its entirety.

Thus it is seen that the methods of the present invention readily achieve the ends and advantages mentioned as well as those inherent therein. As will be readily appreciated by those skilled in the art, the present control methods are capable of other embodiments and of being practiced and carried out in various ways within the spirit of Applicants' inventive concept.

We claim:

1. A masterless control method for controlling a plurality of heating devices operably connected in a network to meet a heating demand, wherein each of said plurality of heating devices has a controller which communicates to other heating device controllers within said network via a communication bus and each said controller maintains at least one list of usage planning data, said method comprises steps of:
   (a) configuring each said controller to periodically broadcast, at an interval, a message comprising an identification number (ID) and at least one usage planning data item;
   (b) configuring each said controller to listen to and receive messages from external controllers on said communication bus; and
   (c) configuring each said controller to set a timer upon receiving a message from one of said external controllers, wherein said timer is associated with said one of said external controllers,
   wherein if said timer expires, said at least one usage planning data item associated with said one of said external controllers is removed from said at least one list of usage planning data and if the usage planning data associated with said one of said external controllers is received prior to the expiration of said timer, said at least one usage planning data item is retained and said timer is reset and restarted.

2. The masterless control method of claim 1, further comprising:
   sorting said at least one list of usage planning data based on a predetermined key to produce a sort result; and
   executing a function based on said sort result.

3. The masterless control method of claim 1, wherein said at least one usage planning data item is a parameter selected from the group consisting of a relative remaining life value, a target output temperature, a real-time clock time, a programmed heating device turn-on time and duration, an error code, a value corresponding to a maximum output of each of said plurality of heating devices and combinations thereof.

4. The masterless control method of claim 2, wherein said predetermined key is the ID of each said heating device.

5. The masterless control method of claim 3, wherein said predetermined key is relative remaining life.

6. The masterless control method of claim 1, wherein said plurality of heating devices is selected from the group consisting of water heaters, boilers, thermal driers, air heaters, fluid heaters, solids heaters, combined heat and power systems and combined cooling, heat and power systems.

7. The masterless control method of claim 6, further comprising at least one failsafe measure which requires a shared component of a failed heating device of said plurality of heating devices to continue to operate.

8. The masterless control method of claim 7, wherein said at least one failsafe measure is selected from the group consisting of:
   (a) requiring a blower of a failed heating device of said plurality of heating devices to remain in operation for venting flue gas; and
   (b) requiring a valve of a failed heating device of said plurality of heating devices to be disposed in a position for meeting said heating demand.

9. A masterless control method for controlling a plurality of heating devices operably connected in a network to meet a heating demand, wherein each of said plurality of heating devices has a controller which communicates to other heating device controllers within said network via a communication bus and each controller maintains at least one list of usage planning data, comprising steps of:

supplying power to said each heating device controller;

configuring the controller of said each heating device to broadcast a message to said communication bus, wherein said message comprises an identification (ID) and at least one usage planning data item;

configuring the controller of said each heating device to listen to and receive messages from other controllers on said communication bus;

reconciling said at least one list of usage planning data by removing expired usage planning data and adding new usage planning data and then sorting said at least one list of usage planning data based on a predetermined key to produce a sort result;

executing a function based on said sort result;

configuring the controller of said each heating device to update usage planning data; and providing at least one failsafe measure which requires a shared component of a failed heating device of said plurality of heating devices to continue to operate, wherein said at least one failsafe measure is selected from the group consisting of:

(a) requiring a blower of a failed heating device of said plurality of heating devices to remain in operation for venting flue gas; and (b) requiring a valve of a failed heating device of said plurality of heating devices to be disposed in a position for meeting said heating demand.

10. The masterless control method of claim 9, wherein said at least one usage planning data item is a parameter selected from the group consisting of a relative remaining life value, a target output temperature, a real-time clock time, a programmed heating device turn-on time and duration, an error code, a value corresponding to a maximum output of each of said plurality of heating devices and combinations thereof.

11. The masterless control method of claim 9, wherein said predetermined key is the ID of each said heating device.

12. The masterless control method of claim 10, wherein said predetermined key is relative remaining life.

13. The masterless control method of claim 9, wherein said plurality of heating devices is selected from the group consisting of water heaters, boilers, thermal driers, air heaters, fluid heaters, solids heaters, combined heat and power systems and combined cooling, heat and power systems.

14. A masterless control method for controlling a plurality of water heaters fluidly and operably connected in a network to meet a hot water demand, wherein each of said plurality of water heaters has a controller which communicates to other water heater controllers within said network via a communication bus and each controller maintains at least one list of usage planning data, comprising steps of:

supplying power to said each water heater controller;

configuring the controller of said each water heater to broadcast a message to said communication bus, wherein said message comprises an identification number (ID) and at least one usage planning data item;

configuring the controller of said each water heater to listen to and receive messages from other controllers on said communication bus;

reconciling said list of usage planning data by removing expired usage planning data and adding new usage planning data and then sorting said at least one list of usage planning data based on a predetermined key to produce a sort result;

executing a function based on said sort result;

configuring the controller of said each water heater to update usage planning data; and providing at least one failsafe measure which requires a shared component of a failed water heater of said plurality of water heaters to continue to operate, wherein said at least one failsafe measure is selected from the group consisting of:

(a) requiring a blower of a failed water heater of said plurality of water heaters to remain in operation for venting flue gas; and (b) requiring a valve of a failed water heater of said plurality of water heaters to be disposed in a position for meeting said hot water demand.

15. The masterless control method of claim 14, wherein said at least one usage planning data item is a parameter selected from the group consisting of a relative remaining life value, a target output temperature, a real-time clock time, a programmed water heater turn-on time and duration, an error code, a value corresponding to a maximum output of each of said plurality of water heaters and combinations thereof.

16. The masterless control method of claim 14, wherein said predetermined key is a key selected from the group consisting of the ID of each said water heater and relative remaining life.

* * * * *